Dec. 16, 1941.                    W. B. DEAN                    2,266,722
                    CARRIAGE BODY OF LIGHT RAILROAD VEHICLES
                        Filed June 12, 1939           5 Sheets-Sheet 1
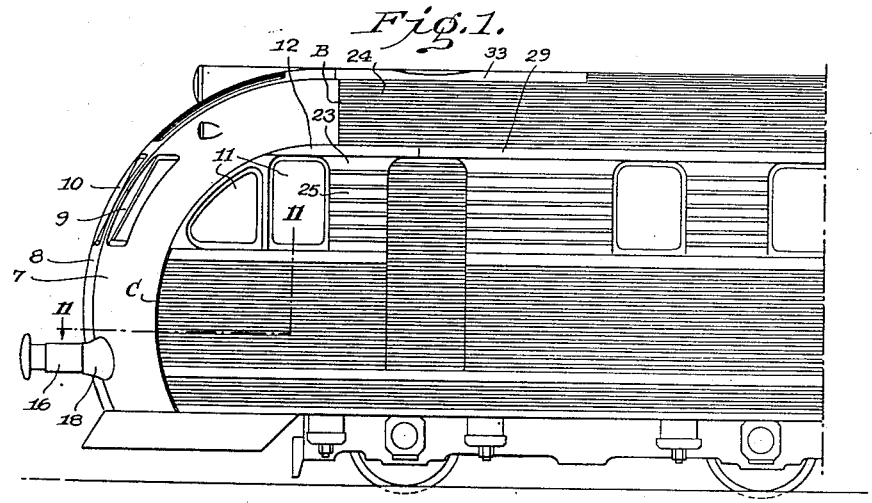
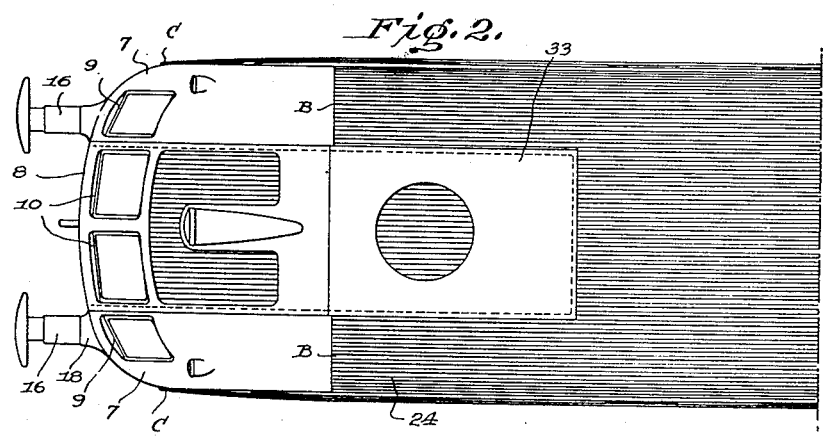
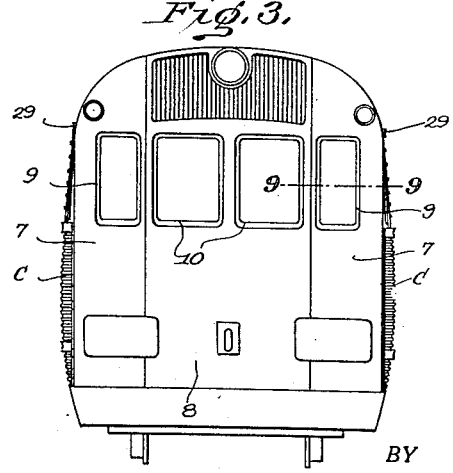
INVENTOR:
Walter B. Dean
BY
John P. Tarbox
ATTORNEY

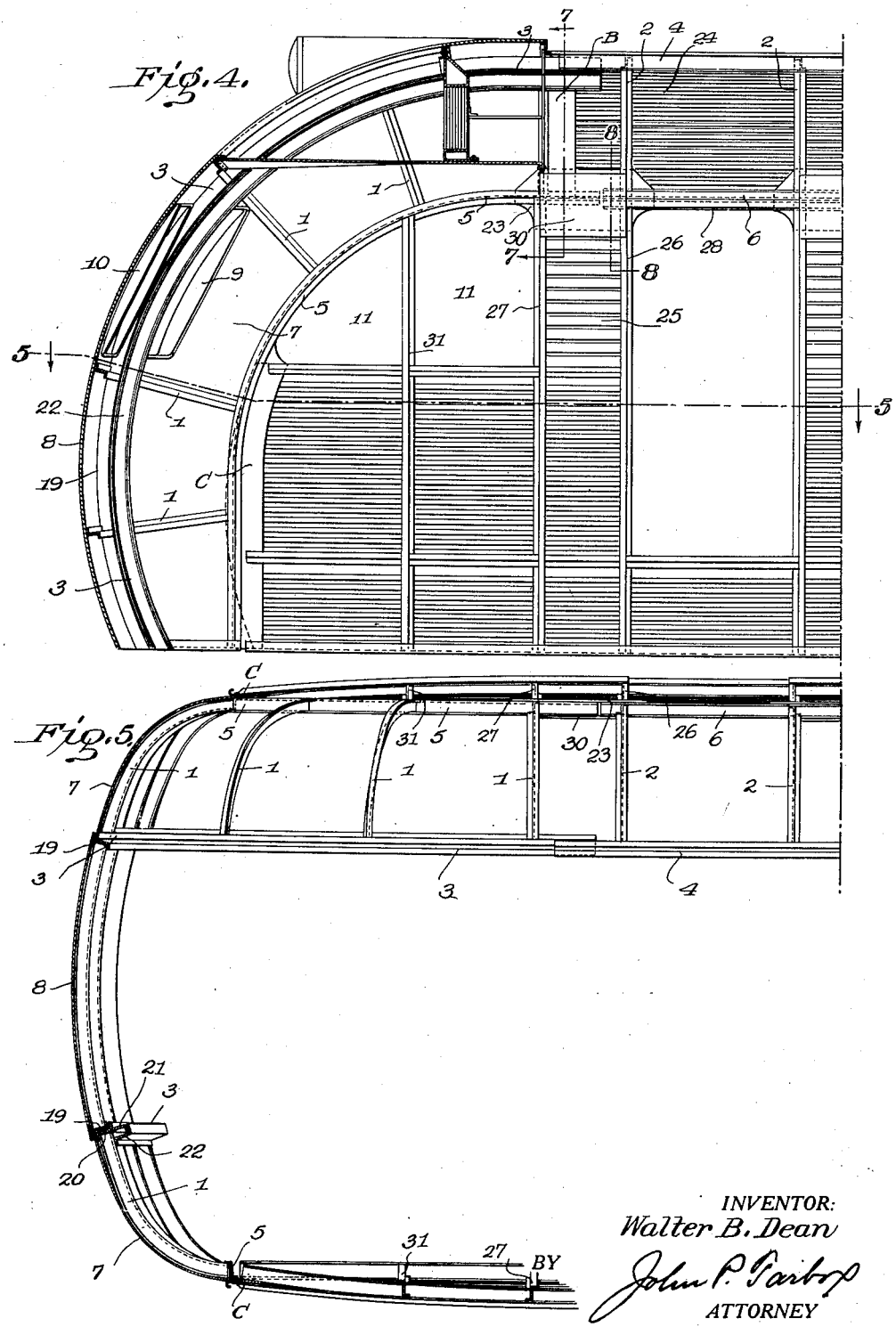

Dec. 16, 1941.  W. B. DEAN  2,266,722
CARRIAGE BODY OF LIGHT RAILROAD VEHICLES
Filed June 12, 1939  5 Sheets-Sheet 3
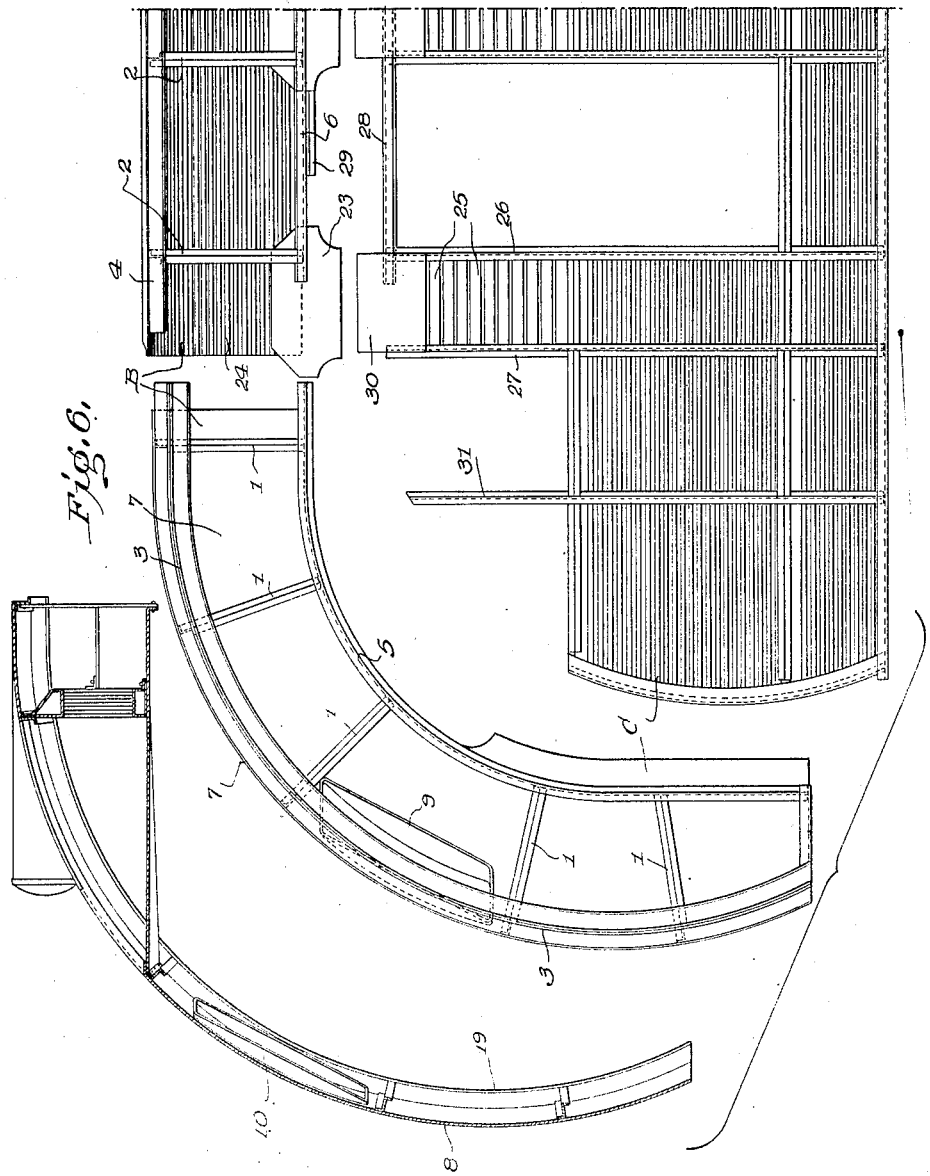
INVENTOR
Walter B. Dean
BY John P. Tarbox
ATTORNEY

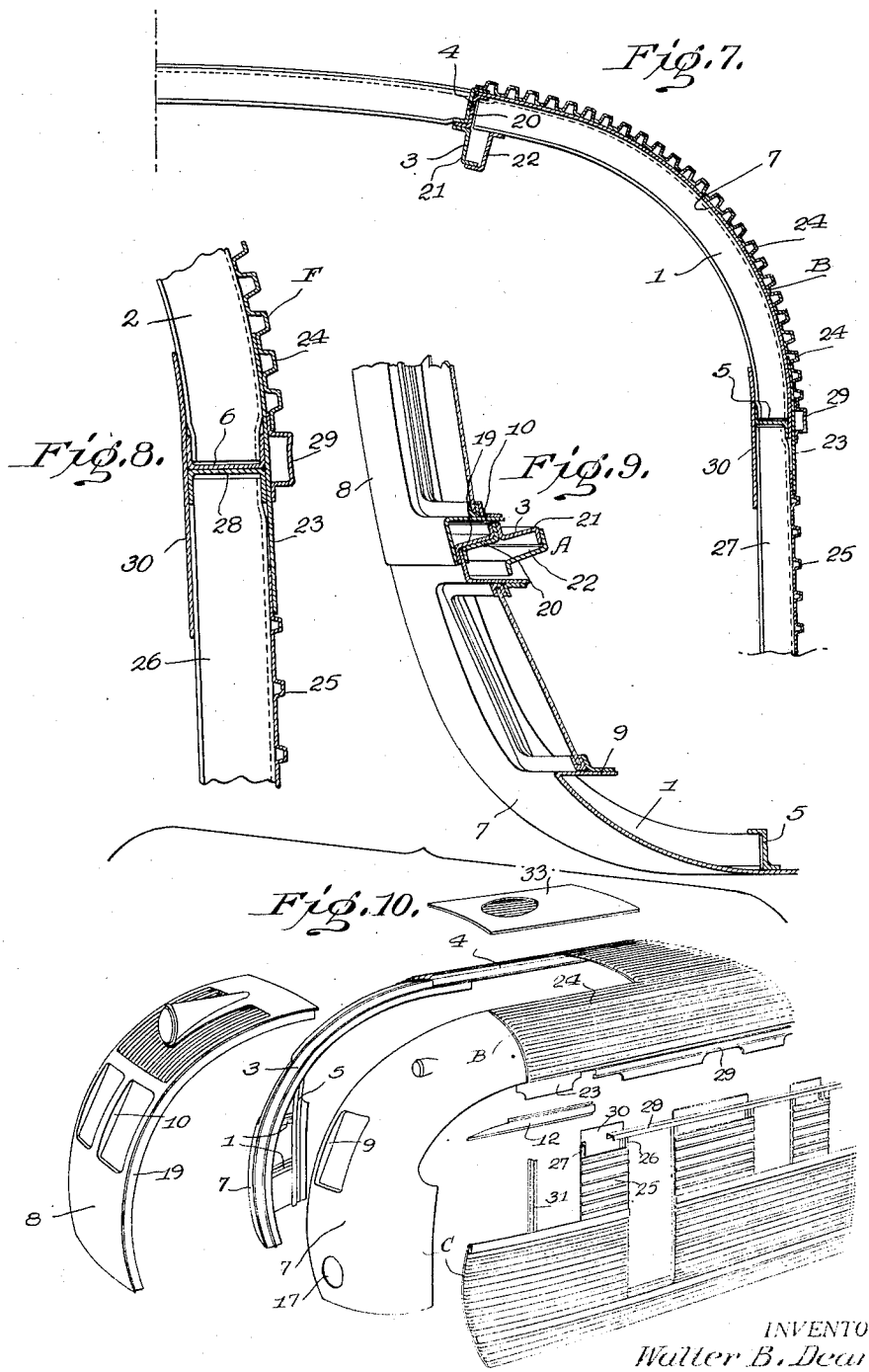

Dec. 16, 1941.  W. B. DEAN  2,266,722
CARRIAGE BODY OF LIGHT RAILROAD VEHICLES
Filed June 12, 1939  5 Sheets-Sheet 5

INVENTOR:
Walter B. Dean
BY John P. Bastrop
ATTORNEY

Patented Dec. 16, 1941

2,266,722

UNITED STATES PATENT OFFICE 2,266,722

CARRIAGE BODY OF LIGHT RAILROAD VEHICLES

Walter B. Dean, Paris, France, assignor to Edward G. Budd Manufacturing Co., Philadelphia, Pa., a corporation of Pennsylvania Application June 12, 1939, Serial No. 278,765

12 Claims. (Cl. 105—396)

The present invention relates to carriage bodies for light railroad vehicles, and especially (but not exclusively) for stainless steel carriage bodies and it aims more particularly at the special arrangement of the body ends which each possess the following characteristic features:

The skeleton framework of each body end is made up of Z section end curved members that are identical with the carlines that support the roof. These end curved members are disposed according to the radii of a circular arc or according to any other curve and this makes it unnecessary to buckle them or perform other difficult shaping operations. Due to this arrangement, the construction of the end is considerably simplified, especially in comparison with known types of construction in which the end ribs are profiles disposed parallel to the ground and requiring a bending or other similar operation in several planes to permit obtaining of the desired bent shape for each curved member.

The panels that cover the end curved members are necessarily contoured and are consequently very rigid; they form segments of a surface of revolution and may be identical in the sense that there are no right-hand panels or left-hand panels. These panels may thus be easily die pressed, and this permits a saving of the labor and tool equipment required by previous modes of construction.

The window sashes are not supported by the end curved frame members but are free of them and supported in the contoured panels of the ends.

The central shock or collision beams (which constitute the continuation of the longitudinal deck sills) and the lateral front posts (which constitute the continuation of the side roof girders and which go around the lateral window frames) form circular arcs (or any other similar curve) and can thus be shaped without difficulty on a bending machine, and this permits the effecting of a saving of labor and of the material required for the manufacture of the conventional posts. As regards the shock or collision beams, they can be given sufficient strength by combining several Z section elements to form a group for each beam, all the elements of Z shape being formed on the same bending outfit.

All the joints between the body end and the remainder of the same are lapped joints at the spots where the corrugated sheet metal of the deck and that of the sides lap, respectively, over the smooth sheets of the end. Each joint made in this way constitutes by its nature a local reinforcement of great rigidity. This method of making the joints is of supreme importance when the body is obtained by the assembly of separately constructed body elements or subassemblies, because it is thus possible to admit a great tolerance for the different dimensional variations. In other words, the slight irregularities that may occur in the length of the deck, of the sides and of the floor cannot in any way interfere with the curved corner plate of each car end because of lapped joints permit of compensating dimensional variations that may even exceed ten millimeters without lessening the strength of the structure or changing the appearance of the car.

Lapped joints are also provided for the connection, on the one hand, between the shock or collision beams and the longitudinal deck sills and, on the other hand, between the front side window posts and the top moulding of the side windows, and this arrangement permits of obtaining great constructional strength by means of simple joints that are easily obtained at the time when the constitutive elements or separate subassemblies of the body are assembled.

The end panels are not attached directly to the car chassis or underframe because an arrangement of this kind would result in complicated curves in the said frame, and these curves might not eventually correspond exactly to the shape of the ends at the time of final assembly. The connection of each body end with the chassis is only effected at the places where there are shock beams and front side window posts.

The above-mentioned method of connection permits of all the possible variations that are likely to occur during the secondary or subassemblings. As regards the shock or collision beams, their connection to the chassis is effected by means of gussets that are arc welded to the chassis at the time of final assembly, the dimensions of these gussets being regulatable as required. The front side window posts are riveted on the front of the first cross girder of the underframe, and this not only permits of easy assembly between the body end and the chassis or underframe, but also the simultaneous compensation of all possible dimensional variations both of the end and of the chassis. Any possible dimensional variations between the first cross frame girder and the second cross frame girder are compensated thanks to the lapped joints between the body end and the sides on account of the front window post forming an integral part of the end.

A large clearance hole is provided for each buffer, and this hole is afterwards covered by a little fairing.

All the lapped joints are located in such a way that a suitable weld can be made at the time of final assembly with welding tongs of medium size. The deck joint is welded through the side window and the deck opening located above the motor; the side joints are welded through the window, at the top and starting from below the skirt.

The body and subassemblies are of such a shape that they can easily be stacked for shipment to the place of final assembly and they possess in themselves considerable strength and rigidity on account of the fact that the collision beam elements form parts of each subassembly and reinforce its edges.

The appended drawings show schematically and by way of example only one embodiment of an improved railroad car according to the present invention.

Figure 1 is a view in side elevation of an end portion of a railway vehicle having a body built in accordance with the invention.

Figure 2 is a plan view of said end portion.

Figure 3 is an end elevation as seen from the left of Figure 1.

Figure 4 is an enlarged central vertical longitudinal sectional view of the vehicle body construction shown in Figures 1, 2, and 3, the light supporting panel alone being shown in full lines.

Figure 5 is a partial horizontal sectional view through the curved end portion shown in Figure 4 taken substantially along the line 5—5 of Figure 4, the longitudinal and transverse framing to the left of the central panel being shown in full lines.

Figure 6 is an exploded view showing the left-hand side subassembly, the left-hand curved end subassembly, the roof subassembly and the central curved end panel subassembly in the relative positions they occupy prior to assembly in the final structure, the central curved end panel being shown in section as it appears in Figure 4; this view shows the inside of the parts entering into the final assembly.

Figures 7 and 8 are detail sectional views taken, respectively, along the correspondingly numbered lines of Figure 4 looking in the direction of the arrows indicated at the ends of the lines.

Figure 9 is a detail sectional view on a large scale along the line 9—9 of Figure 3 as seen in plan.

Figure 10 is an exploded view of the end portion of the body showing the curved end side subassemblies joined to the roof and showing the right-hand side subassembly in position for assembly with the central unit so formed and the central end subassembly likewise in position for final assembly with said unit, the deck cover being shown just above its opening in this unit and a trim member entering into the final assembly joint between the central unit and the side wall unit being shown in position between the two.

Figure 11:
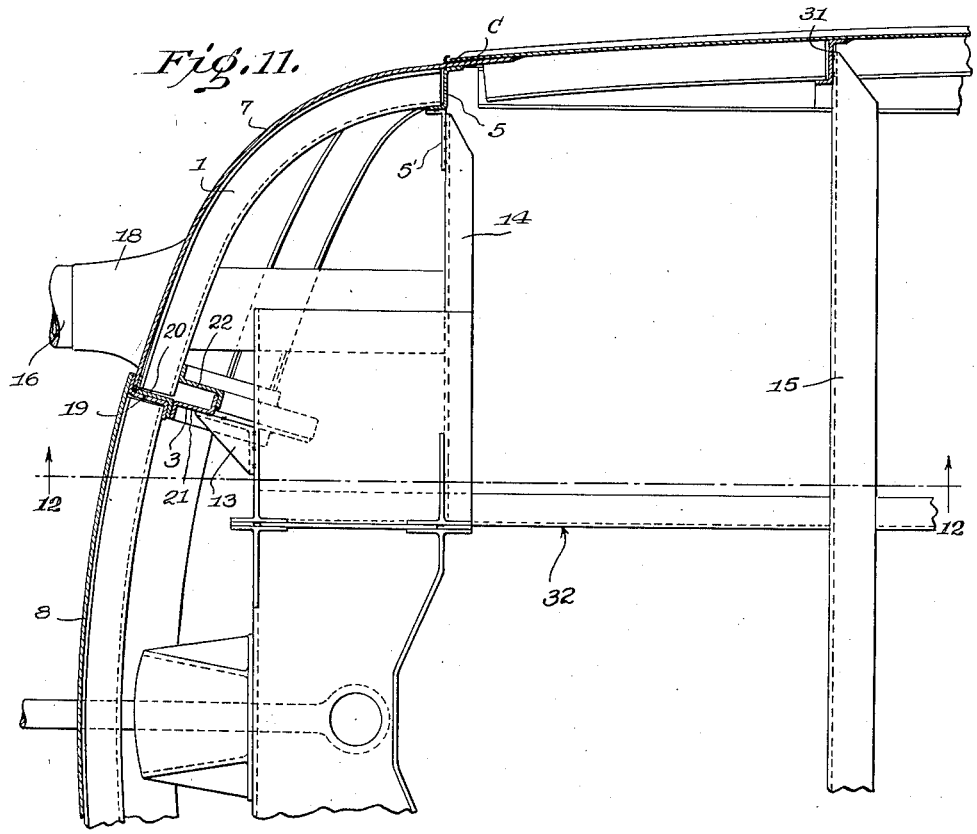

Figure 11 is a fragmentary horizontal sectional view through the end portion, the section being taken above the underframe approximately on the line 11—11 indicated in Figure 1 and showing the connection of the curved end to the underframes.

Figure 12:
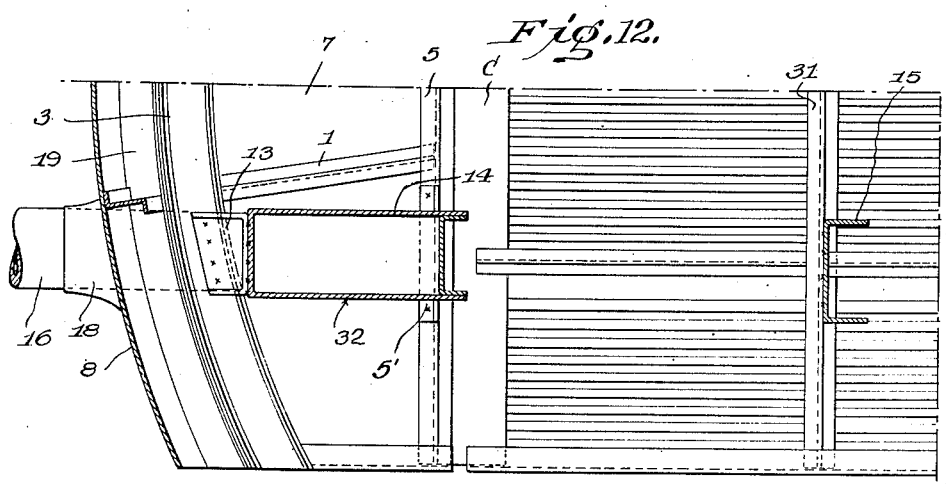

Figure 12 is a fragmentary sectional view through the end portion of the underframe and the end wall associated therewith approximately on the line 12—12 of Figure 11 looking in the direction of the arrows at the ends of the section line.

As can be seen more particularly in Figs. 4 and 5 of the appended drawings, the skeleton framework of each body end is formed by end curved members 1, of Z section for example and identical with the deck curved members 2 that support the roof. These end curved members are disposed along the radii of a circular arc (or along any other desired curve) and this arrangement makes it unnecessary to buckle them or to perform other difficult shaping operations. The shock or collision beams 3 (connected to the end curved members 1) constitute a kind of continuation of the deck sills 4 extending along the sides of the deck opening while the front side uprights 5 constitute a kind of continuation of the side deck girders 6, it being possible to shape the said collision beams and also the uprights without difficulty on a bending machine.

As can be seen more particularly in Figs. 5 and 9, the collision beams 3 may be formed by the assembling and securing together of several Z section elements (or any other suitable section) thus constituting a group of very great strength, each element of which is shaped on the same bending outfit.

As shown in Figs. 4, 5, 6, 9 and 10, the side covering panels 7 and the central panel 8 of the car end are necessarily contoured and are very rigid; they constitute segments of a surface of revolution and the side panels may be identical with each other in the sense that there are no right-hand panels or left-hand panels. These panels can easily be die pressed and this permits a considerable saving to be effected.

The window frames 9 and 10 are not supported by the end curved members 1 but are separately mounted in the contoured panels 7 and 8 of the ends. This avoids the difficulties of fitting the window frames with the car framing.

All the joints between the body end subassemblies and the rest (sides and deck subassemblies) of the said body are lapped joints installed at the spots (B, C) where the corrugated sheets of the deck overlap the smooth end sheets, each joint made in this way constituting by its nature a local reinforcement of great rigidity. This method of making the joints is of very great importance when the body is set up by the assembling of distinct body elements or subassemblies that are constructed separately, because a great tolerance can thus be allowed for the different dimensional variations.

Lapped joints are likewise provided for the connection on the one hand between the collision beams and the deck sills 4 (see Figs. 4 and 7) and, on the other hand, between the front posts 5 which curve around the tops of the side windows 11 and the roof girder 6 (see Figs. 4 and 5). The upper end of the post 5 is connected to the roof girder 6 by an outside gusset 23 the upper part of which is masked on the outside by the corrugated sheet 24 of the deck and the lower part of which (presenting rounded angles which serve as window corners and door corners) is connected to the corrugated sheet metal panel 25 that is attached to the uprights 26 and 27. The top part of the uprights 26 and 27 is connected on the one hand to the post 5 and, on the other hand, to a channel 28 of the side subassembly whose bottom, located towards the top, is connected by welding (or by any other means) to the side deck girder 6 of the roof subassembly, the joint of these two members being masked by a moulding 29. A reinforcing gusset 30 is located beneath the gusset 23 and to the inside of the uprights 26 and 27 and the members 5 and 6 and secured thereto. Finally, the joint assembly at this point is reinforced by a moulding 12, Figs. 1 and 10, that caps the gusset 23 in continuation of the moulding 29 and extends to the edge of the contoured panel 7. In the final assembly, the upright 31 of the side subassembly laps and is joined at the top to the side post 5 of the end subassembly.

The end wall panels or subassemblies are not secured direct to the car chassis or underframe designated generally by 32 because, as already mentioned, an arrangement of this kind would necessitate complicated curved members in the said chassis and these curved members might possibly not correspond exactly to the shape of the ends at the time of assembly. The connection of each body end to the chassis (see Fig. 11) is only made at the places where the collision beams 3 and the front side window posts 5 are located. This method of connection allows for all possible variations that may occur during a secondary or subassembling.

As regards the collision beams 3, their connection to the chassis is effected, as shown in Fig. 11, by means of gussets 13 welded to the chassis in question at the time of final assembly, it being possible to adjust the dimensions of these gussets according to requirements. The posts 5 are connected through an angle as 5' on the front of the first cross girder 14 of the chassis and this not only permits easy assembly between the body ends and the said chassis but also simultaneous compensation of all possible dimensional variations. Any dimensional variations between the first cross girder 14 and the second cross girder 15 of the chassis are compensated by means of the lapped joints (at C) between the body end and the sides, this arrangement being made possible owing to the window post 5 actually being integral with the curved end subassembly of the body.

Each buffer 16 passes through a large clearance hole 17 provided in the contoured panel 7 of the end, this hole being subsequently masked by a little fairing 18, see Fig. 11.

All the lapped joints are positioned in such a way that a suitable welding can be performed with medium size welding tongs at the time of final assembly. The joint B of the deck and body end is made by welding through the side window 11 and the deck opening normally closed by the detachable deck door 33 located above the motor emplacement. The joints C between the sides and the end are made, on the one hand, by welding through the window (for the top part) and, on the other hand, starting from underneath the skirt (for the bottom part).

As can be seen more particularly in Figs. 6 and 10, the detachable central part or subassembly including the panel 8 of the body end and also the side parts or subassemblies including the panels 7 of the said body end are of such a shape that it is easy to stack them and ship them from the place of manufacture to the place of final assembly. All these parts possess in themselves considerable strength and rigidity on account of the fact that certain elements as 19 of the collision beams 3 form part of the detachable central panel or subassembly and that other elements as 20, 21, 22 of the same collision beams form part of the side panels or subassemblies and that the edges of these panels are thus reinforced, the outer edges of the side panels or subassemblies being reinforced by front side posts 5, and these lateral edge reinforcements being connected in each case by the intermediate portions of the end cross members 1 which are in three sections transversely, in accordance with the division into three subassemblies.

It is evident that the example of an embodiment of the railroad car body end that is described above and shown in the appended drawings is given only by way of indication and not of limitation, it being possible for the car body end to undergo many changes of detail without departing from the spirit of the invention.

What I claim is:

1. A rail car or the like having a skeleton framework comprising arched transverse roof carlines and transverse end wall frame members substantially identical in form to said roof carlines and said members arranged in planes radial to a surface of revolution forming the contour of said end wall.

2. A rail car or the like according to claim 1 in which the side panels covering the skeleton frame of the end constitute segments of said surface of revolution and are formed by stampings substantially symmetrical with respect to the vertical central plane of the car and with respect to a central plane radial to said surface of revolution, whereby they may be stamped from the same dies.

3. A rail car according to claim 1 in which the end framework comprises collision members which form continuations of longitudinal roof members and front side posts which form continuations of roof side girders, and are curved in conformity with said surface of revolution.

4. A rail car according to claim 1 in which the end frame members are covered by paneling secured thereto and conforming to said surface of revolution and in which window frames are directly supported by said contoured paneling and are spaced from and independent of the framing, said paneling being flanged in the margins of the window openings.

5. A rail car according to claim 1 in which the end framework comprises central collision members in continuation of longitudinal central roof members and front side posts in continuation of the roof side girders and the end structure is connected to the underframe solely through said collision members and posts.

6. A rail car according to claim 1 in which the end framework comprises central collision members in continuation of longitudinal central roof members and front side posts in continuation of the roof side girders and the end structure is connected to the underframe in final assembly through adjustable gussets.

7. A rail car or the like having an end portion comprising skeleton framing and paneling and rounded transversely and longitudinally, said paneling and framing being built up of three subassembly units, each having marginal joint portions arranged in longitudinal vertical planes, the joint portions of adjacent units arranged to overlap and be secured together in final assembly.

8. A rail car according to claim 7 in which each of the units is reinforced at its lateral margins by an arched member conforming to the curvature of the margin and constituting elements of final assembly joint structures.

9. A rail car according to claim 7 in which each of the units is reinforced at its lateral margins by an arched member conforming to the curvature of the margins and in which some at least of said arched members are arranged adjacent their ends to overlap and form final assembly joints with members of adjacent body units.

10. A rail car body comprising a transversely and longitudinally curved end wall subassembly extending from top to bottom of the body and including interconnected framing and paneling together forming the structurally complete end wall of the body in the region covered by the main body of the subassembly exclusive of its marginal joint parts, said subassembly further including, at the top, a generally horizontal longitudinally extending inner marginal portion and, at a side, a generally vertical longitudinally extending inner marginal portion, the paneling of said marginal portions being arranged to form wide lap joint parts providing, in final assembly, for wide overlapping engagement with, and strong securement to, corresponding marginal joint parts of adjacent similarly structurally complete roof and side wall structures.

11. A rail car body according to claim 24, in which the framing of the end wall subassembly includes marginal reinforcing members along its lateral margins and the paneling is smooth, said marginal reinforcing members being arranged to form additional final assembly lap joint structures for joinder in final assembly with corresponding members of the adjacent roof and side wall subassemblies, and said roof and side wall subassemblies each include longitudinally corrugated paneling arranged to have the ends thereof overlap to a substantial extent the smooth longitudinally extending inner marginal portions of the end subassembly and be strongly secured thereto in final assembly.

12. A rail car having a curved end subassembly merging at the top into a generally horizontally extending roof portion, and at its side into a generally vertically extending portion, smooth paneling covering said subassembly, said top and side portions being arranged to form wide lap joints with adjacent roof and side subassembly units, the roof and side subassemblies having marginal longitudinal members secured together in final assembly, and the end subassembly also having marginal longitudinal members adapted to form final assembly joints, an extension gusset member forming part of said roof subassembly and overlapping and secured to an outer marginal member of said end subassembly and the marginal member of said side subassembly in final assembly.

WALTER B DEAN.

CERTIFICATE OF CORRECTION.

Patent No. 2,266,722. December 16, 1941.

WALTER B. DEAN.

It is hereby certified that error appears in the printed specification of the above numbered patent requiring correction as follows: Page 4, first column, line 25, claim 11, for "claim 24" read --claim 10--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.